2 Sheets—Sheet 1.

G. N. PALMER,

Assignor to C. La Dow.

Combined Horse-Rake and Hay-Spreader.

No. 9,180. Reissued April 27, 1880.

Charles La Dow, Assignee of George N. Palmer, Inventor

By his Attorneys

Baldwin, Hopkins & Peyton

WITNESSES

Wm. A. Skinkle

Wm. G. Kilgore

2 Sheets—Sheet 2.

G. N. PALMER,

Assignor to C. La Dow.

Combined Horse-Rake and Hay-Spreader.

No. 9,180. Reissued April 27, 1880.

*Charles La Dow: Assignee of*
*INVENTOR*

*George N. Palmer.*

*By his Attorneys*

*Baldwin, Hopkins & Peyton*

*WITNESSES*

*Wm. A. Skinkle.*

*Wm. T. Kilgore*

UNITED STATES PATENT OFFICE.

GEORGE N. PALMER, OF GREENE, N. Y., ASSIGNOR TO CHARLES LA DOW.

COMBINED HORSE-RAKE AND HAY-SPREADER.

SPECIFICATION forming part of Reissued Letters Patent No. 9,180, dated April 27, 1880.

Original No. 51,473, dated December 12, 1865. Application for reissue filed December 9, 1879.

DIVISION A.

*To all whom it may concern:*

Be it known that I, GEORGE N. PALMER, of the town of Greene, in the county of Chenango and State of New York, have invented certain new and useful Improvements in a Combined Horse Hay Raking and Tedding Machine, of which improvements the following is a full, clear, and exact description, reference being had to the accompanying drawings, making part of this specification, and in which—

Figure 1:
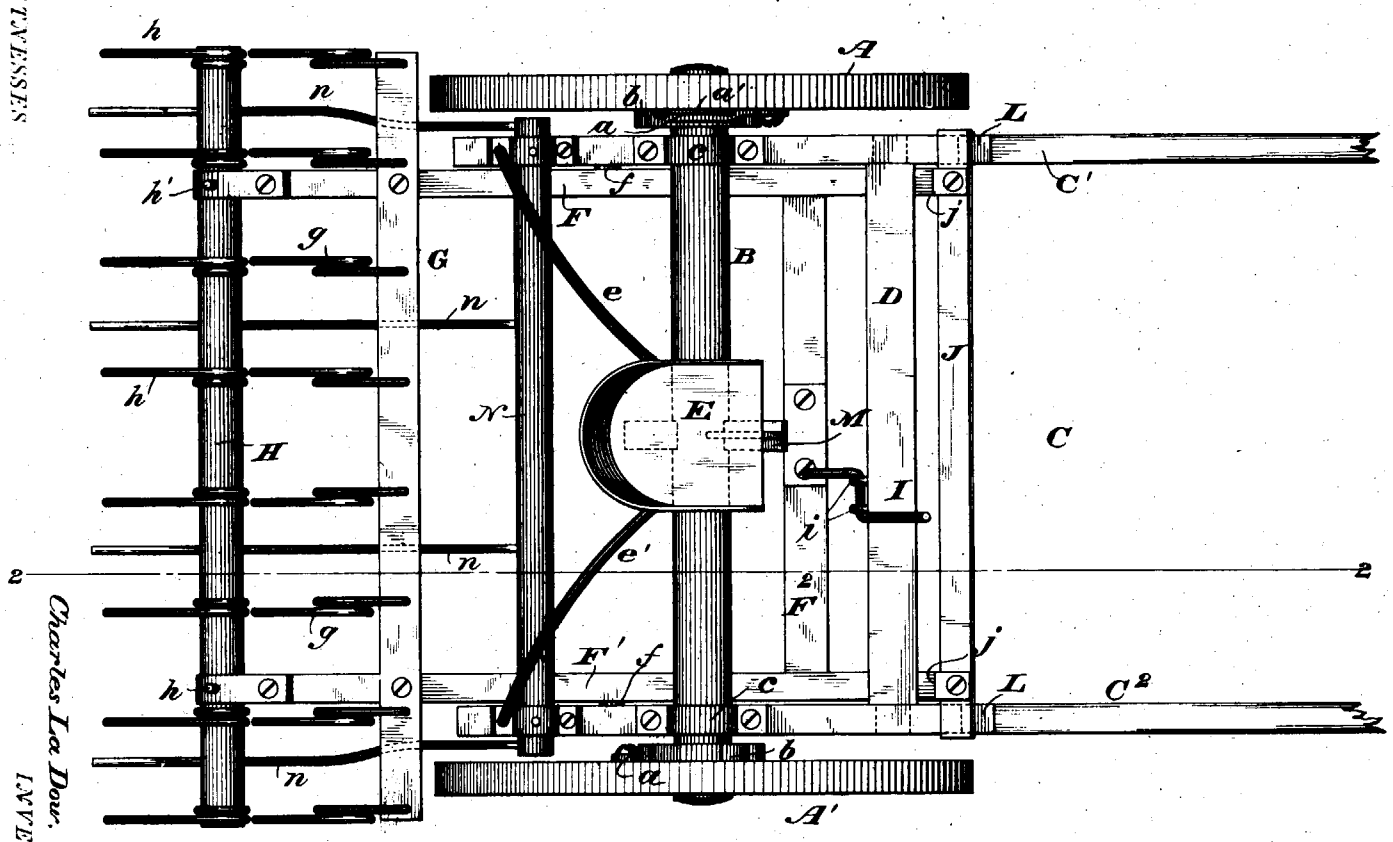
Figure 2:
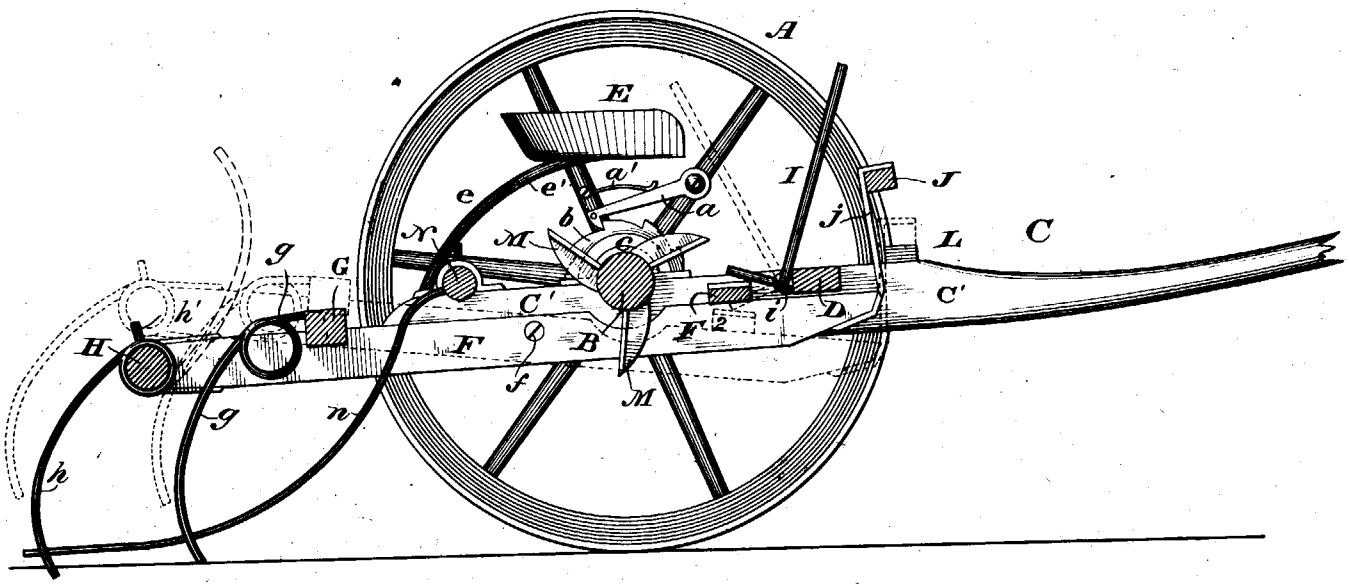

Figure 1 represents a plan or top view of a machine embodying all the improvements herein claimed. Fig. 2 represents a vertical longitudinal section therethrough on the line 2 2 of Fig. 1.

My invention relates to agricultural implements (generally known as "horse hay rakes, spreaders, or tedders") of the class which embody in their organization rake-teeth carried by a vibratory frame pivoted on a main frame mounted on two supporting-wheels, the teeth having the capacity of being either vibrated by the power of the team or raised by hand.

The objects of my invention are, speaking generally, so to organize the mechanism that the cam on the driving-axle shall rotate continuously by power applied from both wheels as the machine advances, and remain stationary when backing; to concentrate the lifting power of both wheels on a revolving cam and to engage the same with the rake-teeth through the medium of a revolving axle and vibratory frame; to so attach the draft-frame to the revolving axle near the wheels that the strain of the draft may not spring the axle and vary the distance between the cam thereon and its point of engagement with the vibratory frame, and to prevent the frame from moving laterally on the axle; to enable the attendant, while in his seat, to raise and lower the rake-teeth by his own efforts; to employ a revolving axle and lifting mechanism thereon to simultaneously vibrate rake-teeth and their carrying-head from the collected hay, the organization being such that not only the points of the teeth, but also their upper ends and the bar by which they are drawn, are vibrated bodily from the collected hay, the traction of the wheels supplying the power required, which is conveyed by means of a revolving axle to the lifting mechanism at a point near the center of the machine between the wheels, the advantage of such construction being that the shocks and strains of the lifting mechanism are received at or about the horizontal center of the rake-head, and there is, therefore, no torsional strain of the vibratory frame and no tendency for either end of the rake-head to sag or hang down, this organization also preventing side jerks on the thill when the head is vibrated by the power of the team; to so mount a vibratory rake-head and its connections in relation to a draft-frame and revolving axle that the head and its connections may be vibrated on one common center by the rotation of the axle; to vibrate a rake-head by means of a revolving axle in such manner that the head shall be steadied from shocks imparted by the cam on the axle by means of connections interposed between the head and the pivots on which it vibrates, said connections permitting the vibration of said head in such manner as shall enable it to move from the collected hay, and without the great friction attending the rocking or revolving of a rake-head in bearings.

These ends I attain by the organization of instrumentalities hereinafter set forth, which organizations comprehend, first, a main frame, a driving-axle, driving-wheels, backing-ratchets connecting each wheel with the axle, a rake-head, rake-teeth, and mechanism on the axle for vibrating the rake-head; second, a cam and driving-axle rotating continuously by power applied from both wheels when the machine is advancing and the backing-ratchets in gear, and a vibratory transverse bar carrying rake-teeth which is vibrated by the cam; third, a main frame, a driving-shaft, a cam on the shaft, driving-wheels, backing-ratchets, and rake-teeth mounted on a vibratory head in rear of the axle; fourth, a draft-frame, a driving shaft or axle mounted thereon, a cam on said axle, driving-wheels on the axle, backing-ratchets interposed between each driving-wheel and the shaft, a supplementary or rake frame rocking on pivots on the draft-frame, and rake-teeth carried by the supplementary frame; fifth, a draft-frame, a main driving shaft or axle, a cam thereon, driving-wheels, backing-ratchets on the axle, a supplementary rake-frame vibrating on pivots on the draft-frame, rake-teeth carried by the vibratory frame, and a stop to limit the movement of said frame when vibrated by the cam; sixth, a draft-frame, a main driving shaft or axle, a cam, driving-wheels, backing-ratchets, a supplementary rake-frame pivoted to the main frame, a stop to limit the vibrations of said frame in one direction, and a spring to assist the return of the frame to its normal position; seventh, a draft-frame, its driving shaft or axle, a driving-wheel thereon, a supplementary rake-frame rocking on pivots on the main frame, rake-teeth, a stop, a cam to vibrate said frame, a spring assisting to restore the frame to its normal position, and keeper or clearer teeth which strip the rake-teeth as they rise; eighth, a draft-frame, a revolving axle, cam thereon, backing-ratchets, driving-wheels, a supplementary rake-frame vibrating on its pivots, rake-teeth mounted on said frame, and clearer-teeth mounted on the main frame; ninth, a draft-frame, its axle, backing-ratchets, driving-wheels, rocking frame, its rake-teeth, a stop to limit the movement of said frame, and a reaction-spring to promote its recoil or return to its normal position; tenth, clearer-teeth mounted on a shaft rocking in bearings on the draft-frame and having the capacity of being adjusted and locked at the desired angle relatively to the rake-teeth; eleventh, a revolving axle, driving-wheels, a main frame, a vibratory rake-head, its pivots, and mechanism on the axle for vibrating the rake-head, said mechanism remaining at rest when the driving-wheels are backed; twelfth, a draft-frame, a vibratory rake-frame, carrying-wheels, a revolving axle, a toothed cam upon the axle the teeth of which project from and in the same plane with the cam, and ratchets on the axle, which revolve the cam in one direction only; thirteenth, arranging a vibratory transverse rake-bar and rigid connections between the bar and the pivots on which it vibrates in such relation to a revolving axle, a toothed cam thereon, a driving-wheel, and a draft-frame that the rotation of the cam may vibrate the rake-bar and its connections on one common center, in order that there shall be no relative displacement between the rake-bar and its supports or connections during different stages of the vibration of the said bar by the cam, said cam (being rotated by the traction of the machine) having sufficient power to vibrate the teeth, their bar, and the connections between the bar and its pivots all at one time; fourteenth, arranging a draft-frame, a revolving axle, a toothed cam thereon, and a driving-wheel for rotating the axle and cam in such relation to a vibratory rake-head, levers rigid therewith at one end of said levers, and pivots for the other end of said levers, that the said rake-head and levers may be vibrated by the rotation of the cam and without joints, hinges, or pivots interposed between the head and the pivots on which it vibrates, the levers being used for the purpose of steadying the head and teeth from shocks caused by the cam during the vibration of the teeth; fifteenth, arranging a draft-frame, a revolving axle, a toothed cam thereon, a driving-wheel, a vibratory transverse bar (for both drawing and carrying rake-teeth) in such relation to levers or connections between the rake-bar and the pivots on which said bar vibrates that the said connections shall cause the teeth and their bar (when vibrated by the cam) to move in the arc of a circle around the pivots on which said connections are mounted, for the purpose of preventing any bind or friction between the head and its teeth and between the head and its connections during all stages of the vibration of the head.

To enable those skilled in the art to make and use a machine embodying my improvements, I will now proceed to describe it more fully with reference to the accompanying drawings and the letters of reference thereon marked, which drawings show two main carrying, driving, or supporting wheels, A A′, revolving loosely on an axle, B, carrying a ratchet, *b*, on each end thereof. A pawl, *a*, on each wheel interlocks with this ratchet, in contact with which it is normally held by a spring, *a′*.

By this mode of construction (which considered by itself is old and well-known in harvesters) the axle is driven, when the machine is moving forward and the backing-ratchets in gear, by both wheels, but released when backing, so as to prevent its backward rotation, and the turning movements of the machine are readily accommodated.

The ratchets and pawls, it will be observed, are arranged on the inner sides of the driving-wheels, and as they act in a vertical plane or one perpendicular to the axle, all lateral pressure or strain is avoided. This arrangement is also common in harvesters, and is therefore not broadly claimed herein.

The main driving axle or shaft B revolves in suitable boxes or bearings *c*, of usual well-known constructions, in a draft-frame, C, shown as consisting of thills or shafts C′ $C^2$, extending behind the axle, arranged at a suitable distance apart parallel to each other and to the carrying-wheels, and connected by suitable cross bars or braces. The front one, D, of these cross-bars is arranged in front of the axle, and adapted for the reception of the draft-connection or whiffletree for the attachment of the team.

A seat, E, for the driver is shown as located over the main axle, but is mounted on supporting standards or arms *e e′* mounted upon the draft-frame.

A secondary supplementary vibratory rake-carrying frame is shown as composed of longitudinal bars or beams F F′, connected and braced in front by a cross-beam, $F^2$, beneath the driver's seat. This frame, it will be observed, extends both in front and rear of the main axle, being connected with the main or draft frame by pivots *f*, which permit it to vibrate vertically. A cross-bar, G, is mounted on this vibrating frame just outside of the periphery of the driving-wheels, which arrangement enables a bar longer than the distance between the wheels to be used. Coiled spring rake-teeth *g* are inserted in this bar a suitable distance apart, and project downward and backward, their length being such as to enable them (when the machine is in its normal condition of working) to drag over the surface over which they are drawn and gather up any substance lying thereon.

The organization of these teeth, as shown in the drawings, is such that while they can be raised or lowered by the vibration of the frame on its pivots, hereinafter more fully explained, they do not turn independently of their shaft or cross-bar, except so far as the resilience of their springs may allow them to yield to avoid or pass around rigid obstructions.

The oscillating rake-head or rock-shaft H turns freely in suitable bearings in the vibrating frame in rear of the fixed rake-head *g*, and is locked in any desired position by thumb screws or pins *h'*, of well-known construction. The upper ends of the rake-teeth *h* encircle the rock-shaft, to which they are secured. This organization admits of the teeth being adjusted at such an angle to the perpendicular or to the set of rake-teeth in advance of it as may be desired. This organization also gives to the rake-teeth an additional capacity of being reversed or turned upward out of the way, and carried on the frame when desired, by revolving their shaft in its bearings.

It will be observed that by the organization shown the weight of the vibratory frame preponderates to the rear of the pivots on which it vibrates, and the teeth consequently tend normally to bear constantly upon the ground. By mounting the rake-teeth upon a head which is vibrated simultaneously with them from the collected hay, neither the head nor teeth are liable to drag it.

The subject-matter herein claimed is irrespective of the employment of two sets or ranks of rake-teeth, which organization constitutes the subject-matter of another division of this reissue.

To enable the driver simultaneously to depress the front end of the rake-frame and to lift the rear end, and consequently the teeth mounted thereon, from the ground, when desired, by manual power, an elbow-lever is shown as rocking in bearings *i* on the main frame, the toe or short end of this lever bearing upon the cross-bar $F^2$, above mentioned. By drawing this lever toward him, the driver can, at pleasure, depress the front end of the frame. As this cross-bar $F^2$ is directly beneath the feet of the driver, it is obvious that his weight can be applied to effect or assist in effecting the same result.

To limit the downward movement of the front end of the rake-frame, and consequently the elevation of the rake-teeth, I employ a stop (shown as consisting of a cross-bar, J) connected with the rocking frame by arms or standards *j*. This cross-bar, it will be observed, is above the side bars of the main frame, and projects laterally over them. Consequently as the supplementary or vibratory frame descends the cross-bar comes in contact with the main frame, and thus limits the movement of the vibratory frame.

In order to insure a prompt return of the rake-teeth to their normal working position after being lifted, I interpose a bumper or spring between the main frame and the vibratory frame, which spring is shown in the drawings as consisting of blocks, L, of india-rubber, resting on the main frame.

In order to vibrate the rake-teeth by the power of the team when desired, I mount a toothed cam, cam-wheel, or tappets, M, upon the main axle at or about a point midway between the wheels, so that in revolving one tooth of the cam bears upon the front cross-bar, F, at or near the horizontal center of the supplementary or vibratory frame, and depresses it. The continued forward movement of the cam then releases the bar by sliding past it, when the spring L immediately increases the distance between the cam and rake-frame at their point of engagement, allowing the rake-carrying frame to resume its normal position until the cam again strikes the cross-bar. This cam, it will be observed, rotates in a vertical plane and acts upon the cross-bar of the supplementary frame in the same plane, thus avoiding lateral thrust or pressure, which would be caused by using laterally-projecting teeth or cams to vibrate a supplementary frame.

A clearer, keeper, or rake-tooth stripper is shown as consisting of a round shaft or head, N, rocking in suitable bearings on the main or draft frame, in which head clearing-teeth or curved rods *n* are secured in well-known ways and inclined downward and backward under the rake-teeth. The angular relation of these clearers to the rake-teeth is controlled by means of set screws or pins which pass through the bearings and lock the head N at the desired angle. These clearing-teeth are shown as extending downward and backward, somewhat in the form of a sled-runner, with their rear ends bearing upon or close to the ground.

The operation of the apparatus will readily be understood from the foregoing description.

As the machine advances, with the backing-ratchets in gear, the cam on the axle is driven by the power of both wheels, but remains stationary when the machine is backed.

The tappets or teeth of the cam act successively upon the front cross-bar of the vibratory frame and raise the rake-teeth, which are thrown down again by the preponderance of the weight of the vibratory frame in rear of its pivots and by the action of the spring.

The rear set of teeth can be turned up out of the way when desired, so as to leave the front set only in operation. The driver can release the ratchets from their pawls, and thus disconnect the driving-wheels from the main axle, and consequently stop the vibration of the rake-frame. The pawls are held out of the ratchets as long as desired by pins inserted into holes made in the wheels for that purpose. The driver can then, by means of the hand-lever, lift the rake-teeth when desired. As his seat is located directly over the front cross-bar of the vibratory frame, it is obvious that he can assist or effect this operation by resting his feet upon said cross-bar and bearing his weight thereon. The stop limits the movement of the rake-frame equally well whether vibrated automatically or lifted by hand.

The well-known Sabin horse-rake had no driver's seat. The lifting-wheel was on the side, and was thrown into and out of gear by a long shipping-lever operated by an attendant walking behind the machine. The attendant lifted the teeth by hand by similar means, and the teeth were pivoted directly on the axle, which was caused to revolve continuously when advancing, and also when backing, being fastened permanently to one working wheel.

I am also aware that it is old in horse hay-rakes to employ the power of the horse drawing the machine to throw up the rake-teeth and discharge the gathered load, and that it is old to effect this by means of a contrivance which will automatically drop the rake when it is raised to the proper height to discharge the load.

I am also aware that it is old in harvesting machinery to employ two driving-wheels, both of which are applied to their axle by pawls and ratchets applied on the inner sides of the said wheels for allowing of their ready removal from their shaft.

I am also aware that heretofore a rake-head and its teeth have been simultaneously vibrated away from the collected hay by manual power, and also by clutches or pins on the carrying-wheels; but, so far as I am aware, such result was not accomplished through the medium of a revolving axle and lifting mechanism thereon, and such machines were consequently open to the objection that in turning the rake-head was lifted by power applied at one end only.

I am also aware that a rake-head has been rocked or turned in its bearings by means of a revolving axle to vibrate the rake-teeth; but such a construction does not possess the advantages of the organization herein claimed, one of which is that both the points and the upper ends of the teeth, and also the bar to which they are attached, are simultaneously vibrated from the collected hay, and are therefore not liable to drag the same.

I claim as of my own invention—

1. The combination, substantially as herein-before set forth, of a draft-frame, a driving shaft or axle, driving-wheels on said shaft, a backing-ratchet interposed between each wheel and the axle, a rake-head carrying rake-teeth, and mechanism on the axle for vibrating the rake-teeth and their head simultaneously and in one direction.

2. The combination, substantially as herein-before set forth, of a draft-frame, a revolving driving shaft or axle mounted thereon, driving-wheels on said shaft, a backing-ratchet interposed between each wheel and the shaft, a vibratory transverse bar carrying rake-teeth, and a cam on the axle for vibrating the bar.

3. The combination, substantially as herein-before set forth, of a draft-frame, a revolving driving shaft or axle mounted thereon, a cam on the shaft, driving-wheels on the shaft, a backing-ratchet interposed between each driving-wheel and the shaft, and rake-teeth mounted on a vibrating head in rear of the main axle.

4. The combination, substantially as herein-before set forth, of a draft-frame, its driving-axle, a cam on said axle, driving-wheels, backing-ratchets, a vibrating supplementary or rake frame, pivots connecting the draft and supplementary frames, and rake-teeth carried by the supplementary frame.

5. The combination, substantially as herein-before set forth, of a draft-frame, its main axle, a cam thereon, driving-wheels, backing-ratchets on the axle, a vibratory supplementary or rake frame, pivots connecting the draft and vibratory frames, rake-teeth carried by the vibratory frame, and a stop which limits the movement of said frame when vibrated by the cam.

6. The combination, substantially as herein-before set forth, of a draft-frame, its main axle, cam, driving-wheels, backing-ratchets, supplementary vibratory frame, its pivots, a stop to regulate its movement in one direction, and a spring to assist its recoil in the other.

7. The combination, substantially as herein-before set forth, of a draft-frame, a revolving axle, a driving-wheel, a vibratory frame, pivots, rake-teeth, cam, stop, spring, and keeper or clearer teeth.

8. The combination, substantially as herein-before set forth, of a draft-frame, a revolving axle, a cam thereon, backing-ratchets, driving-wheels, a vibratory rake-frame, its pivots, rake-teeth mounted on the vibratory frame, and clearer-teeth mounted on the draft-frame.

9. The combination, substantially as herein-before set forth, of a draft-frame, its axle, backing-ratchets, driving-wheels, a rocking supplementary frame, its pivots, rake-teeth on the supplementary frame, a stop to limit the movements of said frame, and a spring to promote its recoil or return to its normal position.

10. The combination, substantially as here-inbefore set forth, of the draft-frame, the rock-shaft mounted in bearings therein, mechanism for locking the shaft in its supports, and the clearer-teeth mounted on the shaft.

11. The combination, substantially as hereinbefore set forth, of a revolving axle, driving-wheels thereon, a draft-frame, a vibratory rake-head, its pivots, and mechanism on the axle for vibrating the rake-head, said mechanism remaining at rest when the driving-wheels are backed.

12. The combination, substantially as hereinbefore set forth, of a draft-frame, a vibratory rake-frame, carrying-wheels, a revolving axle, a toothed cam upon the axle the teeth of which project from and in the same plane with the cam, and ratchets on the axle which revolve the cam in one direction only.

13. The combination, substantially as hereinbefore set forth, of a draft-frame, a revolving axle, a driving-wheel, a vibratory transverse bar, pivots therefor, rake-teeth drawn and carried by said bar, connections rigid between the bar and its pivots and vibrating on one common center with the bar, and a cam on the axle for vibrating the bar.

14. The combination, substantially as hereinbefore set forth, of a draft-frame, a revolving axle, a driving-wheel, a vibratory rake-head, its pivots, levers rigid with the head and connecting it directly with the pivots on which it vibrates, and a cam on the axle for vibrating the head.

15. The combination, substantially as hereinbefore set forth, of a draft-frame, a revolving axle, a driving-wheel, a vibratory transverse bar for drawing and carrying the rake-teeth, pivots on which the bar vibrates, levers for causing the bar to move in the arc of a circle around the pivots on which it is mounted, and a cam on the axle for vibrating the bar.

GEO. N. PALMER.

Witnesses:
H. V. RANSOM,
MICHAEL MCINEREY.